United States Patent
Rahamim

(10) Patent No.: US 9,500,506 B2
(45) Date of Patent: Nov. 22, 2016

(54) METHOD AND SYSTEM FOR STAMPING AND MARKING FLUID IN A PIPE NETWORK FOR SMART MONITORING SYSTEMS

(75) Inventor: Dan Dayan Rahamim, Nirit (IL)

(73) Assignee: WATERSIGN LTD, Yavne (IL)

( * ) Notice: Subject to any disclaimer, the term of this patent is extended or adjusted under 35 U.S.C. 154(b) by 337 days.

(21) Appl. No.: 14/386,212

(22) PCT Filed: Mar. 20, 2012

(86) PCT No.: PCT/IL2012/050097
§ 371 (c)(1),
(2), (4) Date: Sep. 18, 2014

(87) PCT Pub. No.: WO2012/127470
PCT Pub. Date: Sep. 27, 2012

(65) Prior Publication Data
US 2015/0020606 A1   Jan. 22, 2015

Related U.S. Application Data

(60) Provisional application No. 61/454,594, filed on Mar. 21, 2011.

(51) Int. Cl.
*G01F 1/704* (2006.01)
(52) U.S. Cl.
CPC .................... *G01F 1/704* (2013.01)
(58) Field of Classification Search
None
See application file for complete search history.

(56) References Cited

U.S. PATENT DOCUMENTS

| 3,523,454 A | 8/1970 | Rusnak |
| 2002/0098526 A1* | 7/2002 | Bamdad ................. B82Y 30/00 435/7.9 |
| 2005/0016593 A1* | 1/2005 | Ephrat ............... G05D 16/2086 137/488 |
| 2008/0109175 A1 | 5/2008 | Michalak |
| 2008/0282808 A1 | 11/2008 | Trieu et al. |
| 2011/0040503 A1* | 2/2011 | Rogers ................... B67D 7/222 702/55 |

FOREIGN PATENT DOCUMENTS

WO   96/15427   5/1996

OTHER PUBLICATIONS

International Search Report and Written Opinion for International Application PCT/IL2012/050097, mailed Sep. 5, 2012.

* cited by examiner

*Primary Examiner* — Harshad R Patel
(74) *Attorney, Agent, or Firm* — The Law Office of Joseph L. Felber

(57) ABSTRACT

The invention provides a system and method for determining fluid flow in a fluid pipe network. One or more markers are installed a various locations on the pipe network. Each marker generates an alteration in one or both of an initial fluid flow and an initial fluid pressure at the marking location of the marker. The alteration is characterized by one or more parameters whose values are indicative of one or both of the initial fluid flow and the initial fluid pressure at the marking location of the marker. One or more sensors are also installed on the network that detect one or both of a fluid pressure or a fluid flow rate at one or more sensing locations in the pipe network and generate a signal indicative of one or both of the fluid pressure and the fluid flow rate at the sensing location of the sensor. A processor analyzes the signal generated by each sensor to determine one or both of the initial fluid flow rate and initial fluid pressure at the marking locations.

14 Claims, 3 Drawing Sheets

METHOD AND SYSTEM FOR STAMPING AND MARKING FLUID IN A PIPE NETWORK FOR SMART MONITORING SYSTEMS

FIELD

This invention relates to systems and methods for monitoring activity of a fluid such as water or gas.

BACKGROUND

Consumption by an end user of various substances such as water or gas is commonly monitored using a flow meter that is installed for each individual customer on their respective supply line. In many cases, meter readings are collected manually. Manually meter reading is labor intensive, and expensive. As a result, electronic meters have been introduced to allow for quicker, more efficient, and more accurate collection of consumption data. The electronic meters measure usage by monitoring flow through a conventional, mechanical meter. The usage readings are stored electronically and then transmitted via radio signals to a central station for processing.

U.S. Pat. No. 7,504,964 to Brennan et al, for example discloses a measuring meter system that includes a meter that monitors usage of a distribution system, an electronic data recorder that processes data from the meter, and an external unit that controls the processing of data in the electronic data recorder with a communication protocol.

U.S. Pat. No. 7,508,318 to Casella et al discloses an apparatus for measuring and storing flow information for a fluid flowing through each of a plurality of meters in a single unit in a multi-unit structure. Each meter operates independently of the other meters. Also discloses is wireless transmission of the flow information with a unique identifier associated with each meter.

U.S. Pat. No. 7,920,983 to Peleg et al discloses a computerized method for monitoring a water utility network. The method includes receiving meter data representing parameters measured by the meters, such as flow, pressure, of the water being distributed through the pipes. The method also includes receiving secondary data from sources external to the meters and representing conditions affecting consumption of water in a region serviced by the water utility network such as weather and holidays. The meter and secondary data are analyzed using statistical techniques to identify water network events including leakage events and other events regarding quantity and quality of water flowing through the pipes and operation of the water network. The events are reported to users via a user interface.

US Patent Publication No. 20100313958 of Patel et al. discloses a system and method for sensing events affecting liquid flow in a liquid distribution system. Pressure transients in a liquid within a liquid distribution system are detected using a single sensor and the detected transients are used to detect the opening and closing of valves at to specific fixtures. The sensor can be coupled to a faucet bib and transmits an output signal to a computing device. Each such event is identified by the device by comparing characteristic features of the pressure transient waveform with previously observed characteristic features for events in the system. These characteristic features are used to determine the specific fixture where a valve open or close event has occurred. Flow to each fixture and leaks in the system can also be determined from the pressure transient signal.

GENERAL DESCRIPTION

The present invention provides a system and method for monitoring pressure or flow in a fluid delivery pipe network. The pipe network may conduct any fluid, such as water or gas. The technology provided by the invention may be applied to any pipe network such as a pipe network that is part of a municipal distribution system, or an agricultural irrigation system, in which case, the pipe system may span a large geographical area. Alternatively, the technology provided by the invention may be applied to a pipe network that is confined to a single building such as a residential building, industrial plant, or a commercial establishment.

The system of the invention comprises one or more markers that are installed at various marking locations along the pipe network. Each marker is adapted to generate an alteration in one or both of the initial fluid flow and the initial fluid pressure at the marking location of the marker. The alteration is characterized by one or more parameters, and the values of the one or more parameters are indicative of one or both of the initial fluid flow and the initial fluid pressure at the marking location of the marker.

The system also comprises one or more sensors that sense one or both of a fluid pressure or fluid flow at one or more sensing locations in the pipe network, and generate a time dependent signal indicative of the sensed fluid pressure or flow at the sensing location of the sensor. An alteration in the fluid flow rate or fluid pressure induced by any one of the markers at a marker location is manifested in a corresponding alteration the fluid flow rate or fluid pressure at one or more of the sensing locations. The fluid in the pipe network thus serves as a carrier medium for conducting a signal indicative of the flow rate or fluid pressure from a marker to a sensor. Conduction of this signal utilizes the energy imparted to the fluid by the pumping system of the pipe network.

The system of the invention also comprises a processor configured to process the signals generated by the sensors to determine an initial flow rate at one or more of the marking locations on the markers.

The markers may be active markers that are activated by an external energy source. Additionally or alternatively, one or more of the markers may be passive markers that are activated by the kinetic energy of the fluid flow at the marking location.

In one embodiment of the invention, the system of the invention is adapted for monitoring fluid usage at two or more terminal locations in the pipe network. Two or markers are installed along the pipe network, and each marker generates a unique alteration in the initial flow rate or fluid pressure. For example, each marker may be configured to generate an alteration in the initial flow rate having a unique frequency, or phase. This unique feature thus serves as an identifier or signature of the marker that generated the alteration in the flow rate or fluid pressure. In this embodiment, the processor includes a memory that stores the identifier of the alteration generated by each of the markers, so that when the processor can identify the marker of origin of a signal generated by one of the sensors.

When two or more of the markers are active simultaneously, the signal received by sensor may be a weighted sum of the transmitted signals. In this case, the processor may be configured to deconvolute the detected signal into two or more fundamental signals, where each fundamental signal was generated by a different marker. The deconvolution may involve, for example, performing multiple band pass filtering or Fourier transformation. The processor may then determine a flow rate at each of the marker locations from the alteration detected in each fundamental signal.

Thus, in one of its aspects, the invention provides a system for determining fluid flow in a fluid pipe network comprising:

(a) one or more markers, each marker adapted to generate an alteration in one or both of an initial fluid flow and an initial fluid pressure at one or more marking locations in the pipe network, the alteration being characterized by one or more predetermined parameters, the values of the one or more parameters being indicative of one or both of the initial fluid flow and the initial fluid pressure at the marking location of the marker;

(b) one or more sensors adapted to detect one or both of a fluid pressure or a fluid flow rate at one or more sensing locations in the pipe network and to generate a time dependent signal indicative of one or both of the fluid pressure and the fluid flow rate at the sensing location of the sensor; and (c) a processor configured to analyze the signal generated by each of one or more of the sensors to determine one or both of the initial fluid flow rate and initial fluid pressure at one or more of the marking locations.

The system according to claim 1 wherein the alteration generated in the initial flow rate or pressure is selected from a frequency modulated wave, an amplitude modulated wave, and a phase modulated wave.

In the system of the invention, the markers may be activated by an integral energy source or by a fluid pressure or fluid flow in the pipe network. One or more of the markers may comprise, for example, a solenoid valve and a processor which regulates the solenoid valve according to a predetermined pattern. As another example, one or more of the markers may comprise a vane-wheel having a plurality of vanes extending from an axis and a pawl engaging each vane as the vane passes the pawl. As yet another example, one or more of the markers may comprise a spring biased piston inside a housing, the piston executing a reciprocating motion driven by the flow rate or the fluid pressure.

The system of the invention may comprise two or more markers wherein each marker generates a different alteration in one or both of the initial fluid flow and the initial fluid pressure at the marking location of the marker in the pipe network. In this case, the processor may include a memory that stores an identifier of the alteration generated by each of the markers, and the processor may be further configured to identify a marker of origin of a signal detected by a sensor. The processor may also be configured to deconvolute a signal detected by a sensor into two or more fundamental signals, each fundamental signal being generated by a different marker. The processor may also monitor a flow rate at one or more of the markers over a time period and to calculate a fluid consumption at each marker over the time period.

In another of its aspects, the invention provides a method for determining fluid flow in a fluid pipe network comprising:

(a) generating an alteration in one or both of an initial fluid flow and an initial fluid pressure at one or more marking locations in the pipe network, the alteration being characterized by one or more predetermined parameters, the values of the one or more parameters being indicative of one or both of the initial fluid flow and the initial fluid pressure at the marking location of the marker;

(b) detecting one or both of a fluid pressure or a fluid flow rate at one or more sensing locations in the pipe network and generating a time dependent signal indicative of one or both of the fluid pressure and the fluid flow rate at the sensing location of the sensor; and (c) analyzing the one or more generated signals to determine one or both of the initial fluid flow rate and initial fluid pressure at one or more of the marking locations.

In the method of the invention, the alteration generated in the initial flow rate or pressure may be selected from a frequency modulated wave, an amplitude modulated wave, and a phase modulated wave. One or more of the markers may be activated by an integral energy source.

The method may comprise generating an alteration in one or both of an initial fluid flow and an initial fluid pressure at two or more marking locations, wherein a different alteration in one or both of the initial fluid flow and the initial fluid pressure is generated at different marking locations. In this case, the method may further comprise identifying a marker location of origin of a signal detected by a sensor. The method may also comprise deconvoluting a detected signal into two or more fundamental signals, each fundamental signal originating at a different marker location. The method may also include monitoring a flow rate at one or more of the markers over a time period and calculating a fluid consumption at each marker over the time period.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
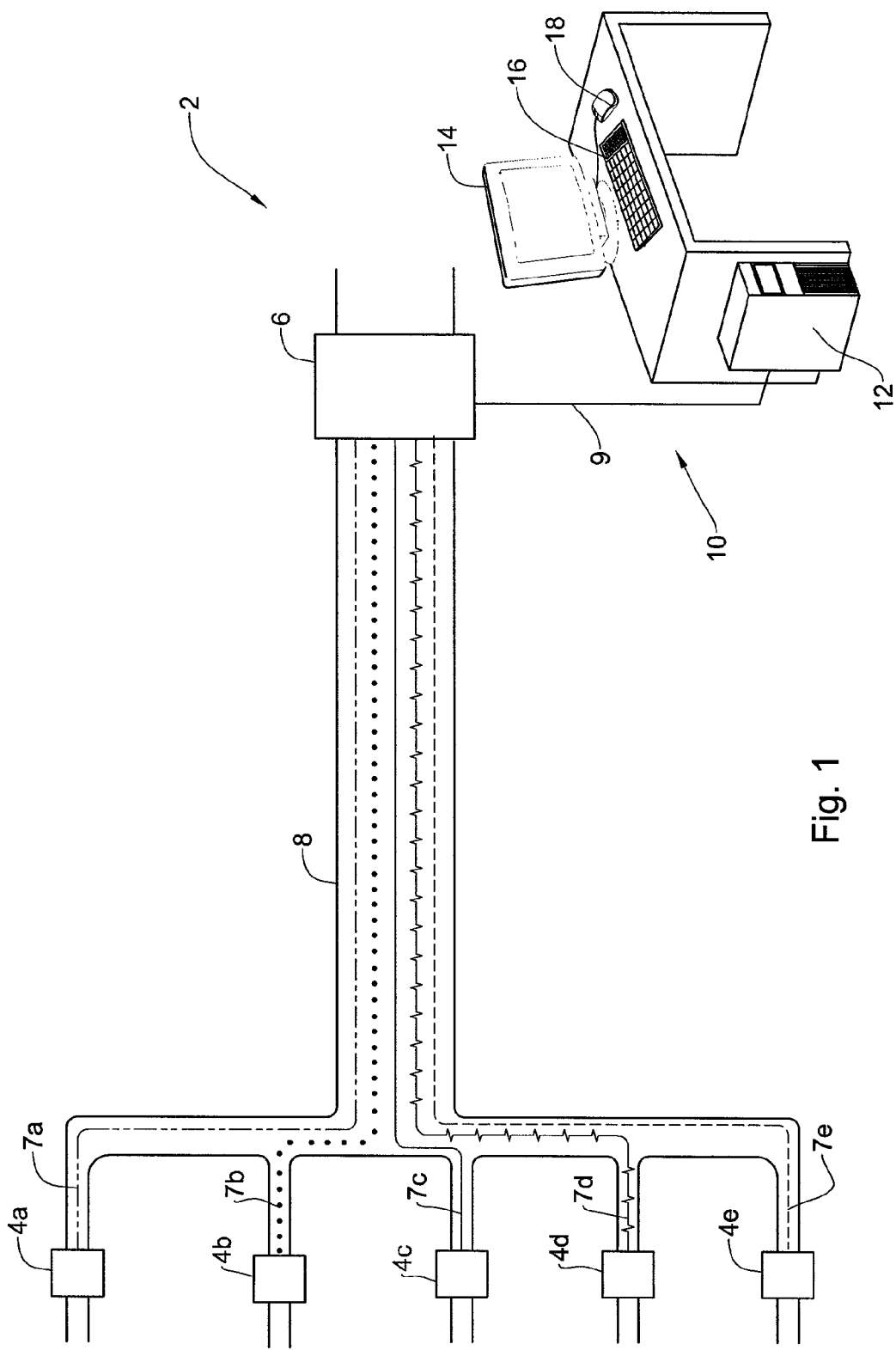
FIG. 1 shows a system for monitoring consumption of a fluid at one or more terminal locations in a pipe network.

FIG. 1 shows a system 2 for monitoring pressure or flow in a fluid delivery pipe network 8. The pipe network 8 may conduct any fluid, such as water or gas. The pipe network 8 may be, for example, part of a municipal distribution system, in which case, the pipe system may span a large geographical area. Alternatively, the pipe network 8 may be confined to a single building. Some of the pipes in the pipe network 8 may be buried under ground or concealed in a wall.

The system 2 comprises one or more markers 4. Five markers 4a, 4b, 4c, 4d, and 4e are shown in FIG. 1. This is by way of example only, and the system 2 may comprise any number of markers 4 as required in any application. The markers 4 are distributed at various marking locations along the pipe network 8. Each marker 4 is adapted to generate an alteration in one or both of an initial fluid flow and an initial fluid pressure at the marking location of the marker. The alteration is characterized by one or more parameters, and the values of the one or more parameters are indicative of one or both of the initial fluid flow and the initial fluid pressure at the marking location of the marker. The initial flow rate or pressure may be, for example, a frequency modulated wave, an amplitude modulated wave, or a phase modulated wave.

The system 2 further comprises one or more sensors 6 that are configured to sense one or both of a fluid pressure or fluid flow at one or more sensing locations in the pipe network 8, and to generate a time dependent signal indicative of the sensed fluid pressure or flow at the sensing location of the sensor. An alteration in the fluid flow rate or fluid pressure induced by any one of the markers 4 at a marker location is manifested in a corresponding alteration the fluid flow rate or fluid pressure at one or more of the sensing locations. The fluid in the pipe network thus serves as a carrier medium for conducting a signal indicative of the flow rate or fluid pressure from a marker 4 to a sensor 6. Conduction of this signal utilizes the energy imparted to the fluid by the pumping system of the pipe network. The one or more sensors 6 are connected to a monitoring station 10 that may include a processor 12, a display screen 14 and one or more user input devices such as a keyboard 16 or a computer mouse 18. Signals generated by the one or more sensors 6 are input to the processor 12 over a connection 9 that may be a wired connection or a wireless connection. The processor 12 is configured to process the signals generated by the sensors 6 to determine an initial flow rate at one or more of the marking locations on the markers 4. The processor may further be configured to monitor one or both of the flow rate or fluid pressure over a time period in order to determined fluid consumption at each of the one or more markers. The results of the processing may be displayed on the screen 14.

The markers 4 are adapted to be installed on a pipe in the pipe network 8. One or more of the markers 4 may be active markers that are activated by an external energy source. Additionally or alternatively, one or more of the markers 4 may be passive markers that are activated by the kinetic energy of the fluid flow at the marking location.

Figure 2:
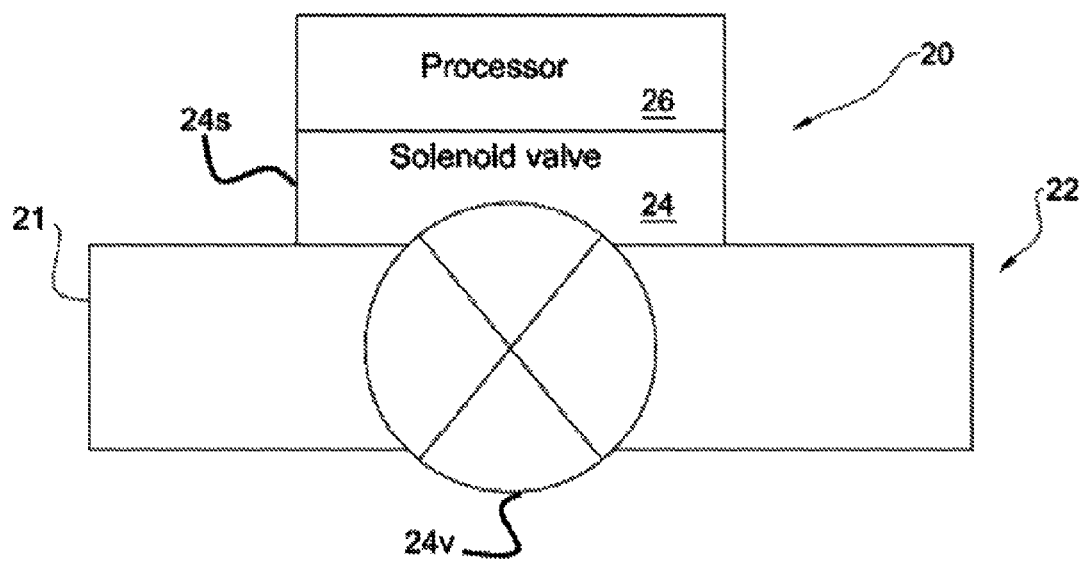
FIG. 2 shows an active marker for use in the system of FIG. 1.

FIG. 2 shows an active marker 20 that may be used for the marker 4, in accordance with one embodiment of the invention. The marker 20 is adapted for installation into a pipeline of the pipe network by means of ports 22 and 21 that may be threaded for attachment to a pipe in the network. The marker 20 comprises a solenoid valve 24, including a solenoid portion 24s and a valve portion 24v, that is adapted to regulate the flow of fluid through the marker between the ports 22 and 21. The solenoid valve 24 is under the control of a programmable processor 26 which regulates the position of the solenoid valve 24 according to a predetermined pattern, and hence alters one or both of the initial fluid flow rate or fluid pressure of the fluid at the location of the marker in the pipe network. As demonstrated below, a predetermined fixed cyclical variation in the opening of the solenoid valve induces an alteration in the initial flow rate and or fluid pressure that is dependent upon one or both of the initial flow rate or fluid pressure.

Figure 3:
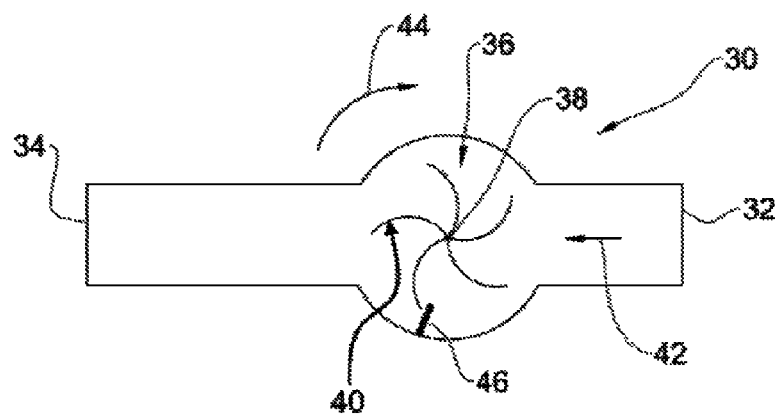
FIG. 3 shows a passive marker for use in the system of FIG. 1.

FIG. 3 shows a passive marker 30 that may be used for the marker 4, in accordance with another embodiment of the invention. The marker 30 is adapted for insertion into a pipeline of the pipe network by means of ports 32 and 34 that may be threaded for attachment to a pipe in the network. The marker 30 comprises a vane-wheel 36 that rotates about an axis 38. A plurality of curved vanes 40 extend from the axis. Flow of fluid through the marker 30 in the direction of the arrow 42 causes the vane-wheel to rotate in the direction of the arrow 44. A pawl 46 extending from the luminal wall of the marker 30 engages each vane as the vane passes the pawl 46. The momentary interaction between the pawl 46 and a vane 40 causes a momentary retardation of the rotation velocity the vane-wheel 36, resulting in an oscillating rotational velocity of the vane-wheel, which introduces a cyclical variation in one or both of the initial fluid pressure and flow rate. The parameters of the alteration can be selected by appropriate selection of the number of vanes 40, the elasticity of the vanes 40 and the length of the pawl 46.

In another embodiment of the marker 4 (not shown), a passive marker comprises a spring loaded piston that executes a reciprocating motion inside a housing driven by the fluid pressure. The reciprocating motion of the piston introduces a cyclical variation in one or both of the initial fluid pressure and flow rate. The parameters of the alteration can be selected by appropriate selection of the characteristics of the spring and the geometry of the housing.

Referring again to FIG. 1, the system 2 may be used for monitoring fluid usage and/or consumption at a plurality of terminal locations in the pipe network 8. The markers 4 are installed at different marking locations along a pipe network. Each marker 4 is configured to generate a unique alteration in the initial flow rate or fluid pressure. For example, each marker 4 may be configured to generate an alteration in the initial flow rate having a unique frequency, or phase. The alteration generated by each marker 4 is transmitted through the fluid in the pipe network as a signal 7 having one or more unique features. Thus, each of the signals 7a to 7e generated by the markers 4a to 4e, respectively, has a unique feature. This unique feature thus serves as an identifier or signature of the marker that generated the alteration in the flow rate or fluid pressure. The processor 12 includes a memory that stores the identifier of the alteration generated by each of the markers, so that when a wave is detected by a sensor 6, the marker which generated the wave can be determined by the processor 12. When two or more of the markers 4 are active simultaneously, the signal received by the sensor 6 is a weighted sum of the transmitted signals. In this case, the processor 12 may be configured to deconvolute the detected signal into two or more fundamental signals, where each fundamental signal was generated by a different marker. The deconvolution may involve, for example, performing multiple band pass filtering or Fourier transformation. The processor then determines a flow rate at each of the marker locations from the alteration detected in each fundamental signal. The processor may further monitor one or both of the flow rate or fluid pressure over a time period at each of the markers in order to determine fluid consumption at each of the markers, for example, by integrating the flow rate at each marker over the time period. The processor may also be configured to compare the signals obtained by two or more sensors located at different sensing locations in order to detect and locate irregular activity in the pipe network, such as leaks, burst pipes, and blocked pipes.

EXAMPLE

Figure 4:
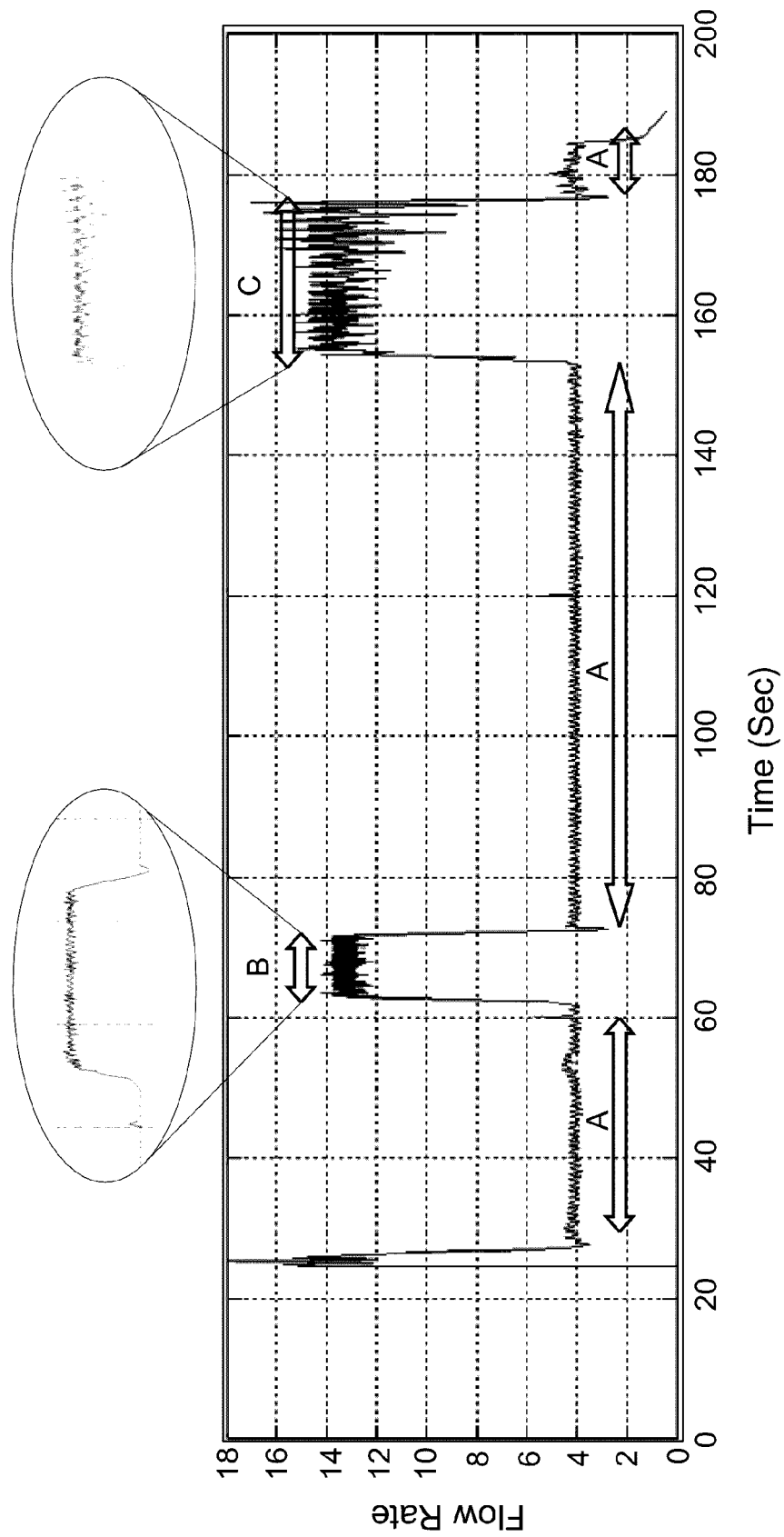
FIG. 4 shows an example of a signal generated by a sensor in one embodiment of the invention.

A marker of the type shown in FIG. 3 was installed on a water pipe in a water distribution pipe network. When the marker was activated, the solenoid valve 24 of the marker was made to execute a cyclical pattern of opening and closing having a frequency of about 1 Hz. A sensor comprising flow meter was placed downstream from the marker. FIG. 4 shows the signal generated by the sensor over a time period of about 3 minutes. Time intervals labeled A are time intervals during which no water was flowing in the pipe adjacent to the marker and the marker was inactive (the pipe remained completely open during this time interval). The signal generated by the sensor during the time intervals A thus represents the baseline signal in the absence of flow and in the absence of activity of the marker. During the time interval labeled B, water was allowed to flow through the pipe adjacent to the marker with the marker inactive (the pipe remained completely open during this time interval). The signal generated by the sensor during the time interval B thus represents the initial flow rate at the location of the marker. During the time interval labeled C, water was allowed to flow through the pipe adjacent to the marker while the marker was activated. The signal detected by the sensor during the time interval C has an AC component having the frequency of the marker and an amplitude that can be correlated with the water flow rate and water pressure at the marker location. Thus, the AC component of the signal recorded during the time interval C reveals the identity of the marker and the initial flow rate or water pressure at the marker location.

The invention claimed is:

1. A system for determining fluid flow in a fluid pipe network comprising:
   (a) a plurality of fluid parameter altering modulators, each marker modulator adapted to generate an alteration in one or both of an initial fluid flow and an initial fluid pressure at a modulating location in the pipe network, the alteration being characterized by one or more predetermined parameters, the values of the one or more parameters being indicative of one or both of the initial fluid flow and the initial fluid pressure at the modulating location of the modulator, wherein the alteration generated in the initial flow rate or pressure is selected from a frequency modulated wave, an amplitude modulated wave, or a phase modulated wave; wherein each of said plurality of modulators is activated by one of the following:
      i) an integral energy source;
      ii) a fluid pressure in the pipe network; and
      iii) a fluid flow in the pipe network;
   (b) one or more sensors adapted to detect one or both of a fluid pressure or a fluid flow rate at one or more sensing locations in the pipe network and to generate a time dependent signal indicative of one or both of the fluid pressure and the fluid flow rate at the sensing location of the sensor; and
   (c) a processor configured to analyze the signal generated by each of one or more of the sensors to determine one or both of the initial fluid flow rate and initial fluid pressure at one or more of the marking locations.

2. The system according to 1 wherein one or more of the modulators comprises a solenoid valve and a processor which regulates the solenoid valve according to a predetermined pattern.

3. The system according to claim 1 wherein one or more of the modulators comprises a vane-wheel having a plurality of vanes extending from an axis and a pawl engaging each vane as the vane passes the pawl.

4. The system according to claim 1 wherein one or more of the modulators comprises a spring biased piston inside a housing, the piston executing a reciprocating motion driven by the flow rate or the fluid pressure.

5. The system according to claim 1 comprising two or more modulators wherein each modulator generates a different alteration in one or both of the initial fluid flow and the initial fluid pressure at the marking location of the marker in the pipe network.

6. The system according to claim 5 wherein the processor includes a memory that stores an identifier of the alteration generated by each of the modulators, and the processor is further configured to identify the modulator of origin of the signal detected by the sensor.

7. The system according to claim 5 wherein the processor is further configured to deconvolute the signal detected by the sensor into two or more fundamental signals, each fundamental signal being generated by a different modulators of said at least two or more modulators.

8. The system according claim 1 wherein the processor is further configured to monitor a flow rate at one or more of the modulators over a time period and to calculate a fluid consumption at each marker over the time period.

9. A method for determining fluid flow in a fluid pipe network comprising:
   (a) generating an alteration in one or both of an initial fluid flow and an initial fluid pressure at one or more modulating locations in the pipe network, with a plurality of modulators, the alteration being characterized by one or more predetermined parameters, the values of the one or more parameters being indicative of one or both of the initial fluid flow and the initial fluid pressure at the modulating location of the modulator, wherein the alteration generated in the initial flow rate or pressure is selected from a frequency modulated wave, an amplitude modulated wave, and a phase modulated wave;
   (b) detecting one or both of a fluid pressure or a fluid flow rate at one or more sensing locations in the pipe network, with at least one or more sensors, and generating a time dependent signal indicative of one or both of the fluid pressure and the fluid flow rate at the sensing location of the sensor; and
   (c) analyzing the one or more generated signals to determine one or both of the initial fluid flow rate and initial fluid pressure at one or more of the modulating locations.

10. The method according to claim 9 wherein one or more of the plurality of modulators are activated by an integral energy source.

11. The method according to claim 10 further comprising identifying a modulating location of origin of a signal detected by a sensor.

12. The method according to claim 10 further comprising deconvoluting a detected signal into two or more fundamental signals, fundamental signal originating at a different modulator location.

13. The method according to claim 9 comprising generating an alteration in one or both of an initial fluid flow and an initial fluid pressure at two or more modulating locations, wherein a different alteration in one or both of the initial fluid flow and the initial fluid pressure is generated at different modulating locations.

14. The method according to claim 9 further comprising monitoring a flow rate at one or more of the modulators over a time period and calculating a fluid consumption at each modulator over the time period.

* * * * *